US012754083B2

(12) United States Patent
Zolfaghari et al.

(10) Patent No.: US 12,754,083 B2
(45) Date of Patent: Oct. 6, 2026

(54) ELECTRICALLY PATTERNED POLYCRYSTALLINE DIAMOND COMPACT FOR SENSING APPLICATIONS

(71) Applicant: Schlumberger Technology Corporation, Sugar Land, TX (US)

(72) Inventors: Alireza Zolfaghari, Rosharon, TX (US); Manuel P. Marya, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 218 days.

(21) Appl. No.: 18/539,843

(22) Filed: Dec. 14, 2023

(65) Prior Publication Data

US 2025/0198861 A1 Jun. 19, 2025

(51) Int. Cl.

| | |
|---|---|
| ***G01L 1/22*** | (2006.01) |
| ***B23K 1/00*** | (2006.01) |
| ***B23K 101/36*** | (2006.01) |
| ***B23K 103/00*** | (2006.01) |
| ***G01N 27/30*** | (2006.01) |

(52) U.S. Cl.
CPC .............. *G01L 1/22* (2013.01); *B23K 1/0016* (2013.01); *G01N 27/308* (2013.01); *B23K 2101/36* (2018.08); *B23K 2103/50* (2018.08)

(58) Field of Classification Search
CPC ...... G01L 1/22; G01N 27/308; B23K 1/0016; B23K 2101/36; B23K 2103/50
See application file for complete search history.

(56) References Cited

U.S. PATENT DOCUMENTS

2011/0266055 A1* 11/2011 DiGiovanni ............ E21B 49/00 175/428
2011/0266058 A1* 11/2011 Kumar .................... E21B 10/08 175/428
2012/0312598 A1* 12/2012 Cheng ..................... E21B 10/62 175/428
2014/0014866 A1* 1/2014 Isenhour ................... F16K 3/08 251/304
2015/0206748 A1* 7/2015 Sumant ............... H01L 21/0262 438/481
2015/0270358 A1* 9/2015 Albarakaty .......... H10D 62/882 438/105
2017/0107768 A1* 4/2017 Saini .................. B24D 18/0009
2017/0253490 A1* 9/2017 Chakraborty ........ B05D 7/5883
2018/0320513 A1* 11/2018 Scott ....................... E21B 47/00
2019/0162042 A1* 5/2019 Leuchtenberg ......... E21B 47/00
(Continued)

OTHER PUBLICATIONS

Graphenea, Graphene for oil exploration, https://www.graphenea.com/blogs/graphene-news/10904145-graphene-for-oil-exploration, Dec. 19, 2013 (Year: 2013).*
(Continued)

*Primary Examiner* — Shizhi Qian
(74) *Attorney, Agent, or Firm* — Kyle R. Miiller

(57) ABSTRACT

A system includes an electrified polycrystalline diamond compact component. The electrified polycrystalline diamond compact component includes one or more graphene surfaces used to generate an electrical signal based on an applied pressure, an applied strain, an applied electrochemical potential, or an applied electromagnetic field, or a combination thereof.

20 Claims, 7 Drawing Sheets

(56) References Cited

U.S. PATENT DOCUMENTS

2021/0321521 A1* 10/2021 Marya .................. H05K 3/0041

OTHER PUBLICATIONS

Apostolova et al., "Ultrafast Laser Processing of Diamond Materials: A Review" Frontiers in Physics, vol. 9, Dec. 7, 2021, 21 pages.
Ashikkalieva et al., "Direct Observation of Graphenic Nanostructures inside Femtosecond-Laser Modified Diamond", Carbon, vol. 102, Jun. 2016, pp. 383-389.
Lagomarsino et al., "Electrical and Raman-imaging characterization of laser-made electrodes for 3D diamond detectors", Diamond and Related Materials, vol. 43, Mar. 2014, pp. 23-28.
Oh et al., "A novel detector with graphitic electrodes in CVD diamond", Diamond and Related Materials, vol. 38, Sep. 2013, pp. 9-13.
Li et al. "The manufacturing and the application of polycrystalline diamond tools—A comprehensive review", Journal of Manufacturing Processes, vol. 56, Part A, Aug. 2020, pp. 400-416.

* cited by examiner

ELECTRICALLY PATTERNED POLYCRYSTALLINE DIAMOND COMPACT FOR SENSING APPLICATIONS

BACKGROUND

The subject matter disclosed herein relates to polycrystalline diamond compact (PDC), commonly referred as polycrystalline diamond composite. More specifically, the subject matter disclosed herein relates to forming a PDC component that is capable to conducting an electrical signal useable for a range of sensing functions normally unavailable to PDC. The PDC material, portions and component made capable of conducting an electrical signal will be referred as electrified.

PDC is formed by sintering (e.g., application of pressure and/or heat) diamond particles (e.g., including one or more micro or nano scale materials) into polycrystalline composites and optionally including one or more other materials such as a cobalt catalyst to promote diamond particle binding. Polycrystalline diamond compact or composite is incorporated into a range of industrial applications exposed to high wear scenarios (e.g., cutting tools for machining, geological and petroleum drill bits, flow-control valve applications, face seal and bearing components) because of PDC's unmatched mechanical properties (e.g., hardness, thermal conductivity, elastic modulus, impact resistance) and high chemical inertness. PDC materials are electrically non-conductive, and not considered for any electrification purposes, including sensing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes an electrified polycrystalline diamond compact component. The electrified polycrystalline diamond compact component includes one or more graphene surfaces used to generate an electrical signal based on an applied pressure, an applied strain, an applied electrochemical potential, or an applied electromagnetic field, or a combination thereof.

In another embodiment, a method includes providing, a polycrystalline diamond compact-containing component. The polycrystalline diamond compact component is treated with an energy source to form one or more graphene surfaces such that the polycrystalline diamond compact component is an electrified polycrystalline diamond compact component.

In another embodiment, a system includes an electrified polycrystalline diamond compact component. The electrified polycrystalline diamond compact component includes one or more graphene surfaces, one or more channels within the electrified polycrystalline diamond compact component and one or more conductive materials within the one or more channels. The one or more conductive materials are joined to the one or more graphene surfaces or to the electrified polycrystalline diamond compact component, or a combination thereof. The one or more graphene surfaces are configured to generate an electrical signal based on an applied pressure, an applied strain, an applied electrochemical potential, or an applied electromagnetic field, or a combination thereof.

These and other features and attributes of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
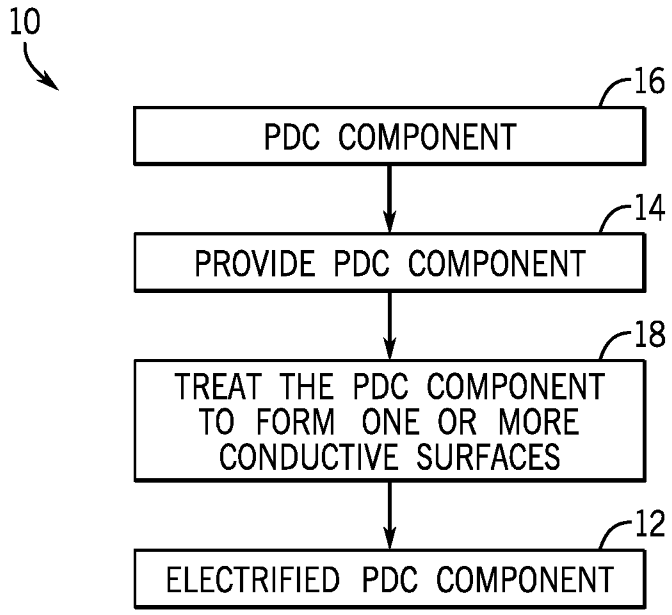
FIG. 1 is a flow diagram of a method for producing an electrified PDC component, in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. All numerical values within the detailed description herein are modified by "about" the indicated value, and take into account experimental error and variations that would be expected by a person having ordinary skill in the art.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. All numerical values within the detailed description herein are modified by "about" the indicated value, and take into account experimental error and variations that would be expected by a person having ordinary skill in the art. For example, "about" or "approximately" may refer to ±0.5%, ±1%, ±2, ±5%, ±10%, or ±15%.

As discussed above, polycrystalline diamond compact (PDC) is utilized in applications where high wear may occur. PDC materials are most commonly used in high stress applications (e.g., mining, drilling), as such, PDC surfaces may be in proximity of mechanical, physical or even chemical changes in the local environment. As referred to herein, the "local" environment or "local to the PDC component" includes the PDC surfaces or the environment surrounding the PDC-component with a threshold range corresponding to a type of measurement. Due to the excellent electrical insulating nature and low thermal conductivity (e.g., approximately 7 W/m K) of conventional PDCs, indication of changes in the PDC local environment (e.g. pressure, strain, wear) are not and cannot be reported during in situ operations using conventional PDCs. It is presently recognized that it may be advantageous to structurally modify the PDC including in PDC components (e.g., drill bits, valve seats, cutting tools, flow diverters) such that the PDC is made electrically conductive (e.g., the PDC includes one or more electrically conductive portions, regions, or areas).

Accordingly, the present disclosure is directed to techniques for producing electrified or electrically patterned PDC. In general, the disclosed techniques relate to an electrified PDC component (e.g., PDC-containing component). The disclosed techniques include treating a PDC component (e.g., a bearing, a bushing, a drill bit, a scaling component, or other oil-field components) with an energy source (e.g., laser, electron beam, thermal source) to form an electrified PDC component including one or more graphene surfaces. For example, carbon rich PDC is scanned with a laser to generate one or more graphene surfaces (e.g., laser-induced graphene) on the PDC component (e.g., non-electrified PDC), thereby generating an electrified PDC component. In turn, the electrified PDC component (e.g., including one or more graphene surfaces) may be used to sense changes (e.g., changes to PDC surface, changes to surroundings) and generate an electrical signal (e.g., applied pressure, an applied strain, an applied electrochemical potential, or an applied electromagnetic field, or a combination thereof). At least in some instances, the electrified PDC component may include electrically conductive materials (e.g., leads, electrodes, wires, etc.) that are electrically coupled (e.g., interconnected, in direct physical contact) to the one or more graphene surfaces of the electrified PDC component. At least in some instances, the electrically conductive materials are interconnected with the one or more graphene surfaces. In any case, the electrified PDC component is used to sense physical, mechanical, or chemical changes local to the electrified PDC component. Accordingly, the present techniques provide increased functionality of PDC components during in situ operations.

Reference is now made to the embodiments illustrated in FIGS. 1-6 wherein like numerals are used to designate like parts throughout.

With the foregoing in mind, FIG. 1 is a flow diagram of an embodiment of a process 10 for producing an electrified PDC component 12. As generally described above, the electrified PDC component 12 generally includes one or more graphene surfaces that may be utilized to sense changes (e.g., changes to PDC surface, changes to surroundings) and generate the electrical signal (e.g., applied pressure, an applied strain, an applied electrochemical potential, or an applied electromagnetic field, or a combination thereof). The electrical signal may be indicative of physical, mechanical, or chemical changes local to the electrified PDC component 12. For example, the physical, mechanical, or chemical changes local to the electrified PDC component 12 may indicate a health condition (e.g., an amount of strain or stress applied to, or an amount of wear to a surface, or a remaining-lifetime of the electrified PDC component 12), a presence of chemical species (e.g., a fluid external to or interacting with the electrified PDC component 12), or an environmental condition of the local environment of the electrified PDC component 12 (e.g., a local pressure and/or a local temperature).

At block 14, the process 10 includes providing a PDC component 16. In general, a PDC component 16 includes one or more PDC portions. For example, the PDC portions may be surfaces (e.g., inner surfaces, outer surfaces, contacting surfaces, or otherwise) or volumes of the PDC component 16. The PDC component 16 may be a bushing, a bearing, a drill bit, or other oil-field components that may be useful for oil and gas operations (e.g., downhole operations). As referred to herein, "oil-field components" refer to uphole components and/or downhole components.

At block 18, the process 10 includes treating, via an energy source, the PDC component 16 to form one or more graphene surfaces to form the electrified PDC component 12. In some embodiments, the energy source may be a laser (e.g., pulsed laser, continuous wave laser, quasi-continuous wave laser). For example, the PDC component 16 may receive laser pulses (e.g., a number of pulses such as 10 pulses, 20 pulses, 50 pulses, 100 pulses, etc.) at various laser power intensities (e.g., 10% laser power, 20% laser power, 50% laser power, 75% laser power, 100% laser power) and wavelengths (e.g., 485 nm, 532 nm, 632 nm, 785 nm, 975 nm, 1060 nm, etc.) to form the one or more graphene surfaces. The graphene surfaces may be patterned using the energy source to form a circuitry pattern, a conductive band, and/or any other suitable graphene pattern. For example, the graphene surfaces may be patterned with a three-dimensional circuitry covering one or more surfaces of the PDC component 16 (i.e., to form the electrified PDC component 12). The three-dimensional circuitry may allow for sensing of changes to the downhole component that includes the PDC component 16. In another example, laser generated localized thermal scans (e.g., raster scanning) form graphene surfaces on the PDC component 16. In this manner, $sp^3$ hybridized carbon atoms of the PDC component 16 (e.g., small diamond grains) are converted to $sp^2$ hybridized carbon atoms as laser irradiation (e.g., photons, thermal effects) generates localized phase conversion. In certain embodiments, the energy source may be an electron beam.

Accordingly, the process 10 of FIG. 1 shows an example process for producing an electrified PDC component 12. The electrified PDC component 12 includes graphene surfaces that are capable of producing a detectable electrical signal that corresponds to a physical, mechanical, or chemical change. The physical, mechanical, or chemical change may indicate a health condition (e.g., an amount of strain or stress applied to, or an amount of wear to a surface, or a remaining-lifetime of the electrified PDC component 12), or a presence of chemical species (e.g., a fluid external to or interacting with the electrified PDC component 12), or an environmental condition of the local environment of the electrified PDC component 12 (e.g., a local pressure and/or a local temperature). Accordingly, the electrified PDC component may be utilized for in situ detection of changes local to the electrified PDC component 12.

Figure 2A:
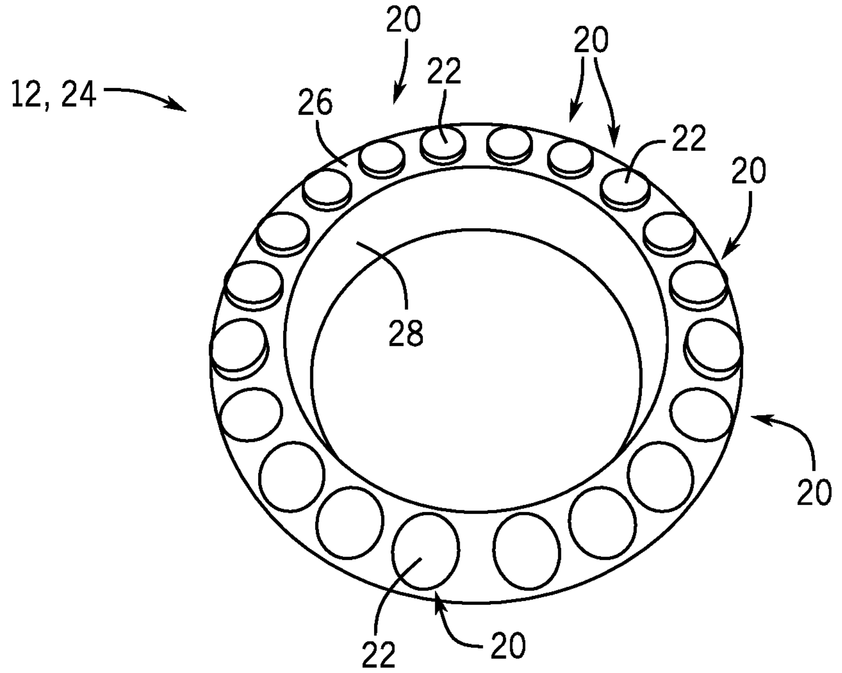
FIG. 2A is a schematic illustration of an embodiment of the electrified PDC component, in accordance with the method of FIG. 1.

As described herein, the electrified PDC component 12 may include one or more graphene surfaces (e.g., surfaces of electrified PDC). To illustrate this, FIG. 2A is a perspective view of an electrified PDC component 12. As shown, the electrified PDC component 12 includes one or more PDC portions 20 (e.g., not electrified, polycrystalline diamond compact portions) and one or more graphene surfaces 22 (e.g., electrified PDC portions). It should be noted that, at least in some embodiments, all of the PDC portions 20 may have the graphene surfaces 22. However, in some embodiments, only a portion (e.g., less than or equal to 80%, less than or equal to 70%, less than or equal to 60%, less than or equal to 50%, less than or equal to 40%) of the electrified PDC component 12 may have the graphene surfaces 22 as shown in the illustrated embodiment. For a few non-limiting examples, every other PDC portion 20 may have the graphene surfaces 22, half of the PDC portions 20 may have the graphene surfaces 22, a third of the PDC portions 20 may have the graphene surfaces 22, and the like.

In some embodiments, the PDC portions 20 on a particular surface (e.g., side, back, front, internal, external, etc.) may contain the graphene surfaces 22. For example, certain PDC portions 20 may be more susceptible to wear due to the particular surface that includes the PDC portions 20. Accordingly, it may be advantageous to form the graphene surfaces 22 on those surfaces (e.g., internal surfaces 28, external surfaces) where physical, chemical, or mechanical change is likely to occur to more quickly and/or accurately measure changes local to the electrified PDC component 12. As shown, the electrified PDC component 12 is a bearing 24. Further, as illustrated, the one or more PDC portions 20 are located on a top surface 26 of the bearing 24 (e.g., the electrified PDC component 12). In general, the graphene surfaces 22 can be on any surface that includes PDC portions 20. However, at least in some instances, it may be advantageous to form the graphene surfaces 22 on a surface in contact with another mechanical component, or a surface that is exposed to a fluid that may corrode (e.g., gradually corrode) the electrified PDC component 12.

Figure 2B:
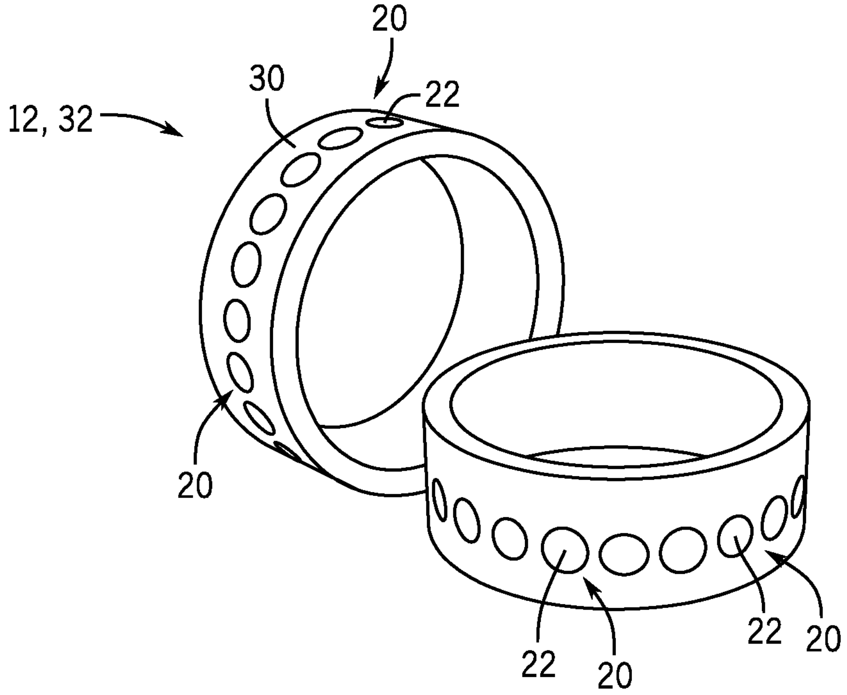
FIG. 2B is a schematic illustration of an embodiment of the electrified PDC component, in accordance with the method of FIG. 1.

Another non-limiting example of an electrified PDC component 12 is shown in FIG. 2B. In particular, FIG. 2B is a perspective view of an electrified PDC component 12. As shown, the electrified PDC component 12 includes one or more PDC portions 20 that includes the graphene surfaces 22. It should be noted that all of the PDC portions 20 may have the graphene surfaces 22. However, in some embodiments only some of the PDC portions 20 or a part of the PDC portions 20 may have the graphene surfaces 22 as shown in the illustrated embodiment.

As shown, the electrified PDC component 12 is a bushing 32. Further, as illustrated, the one or more PDC portions 20 are located on an outer surface 30 of the bushing 32 (e.g., the electrified PDC component 12). In general, the graphene surfaces 22 can be on any surface that includes PDC. However, at least in some instances, it may be advantageous to form the graphene surfaces 22 on an outer surface of the bushing 32. In this manner, the graphene surfaces 22 may contact environmental surroundings of drill jigs as the bushing 32 locates, guides, and/or supports cutting tools during drilling. As the bushing 32 works to help drill jigs run smoothly and increase longevity (e.g., isolate vibrations, reduce noise, isolate shock), the graphene surfaces 22 disposed on the outer surface may be used to sense changes to local environments during drilling operations.

In some embodiments, the electrified PDC component 12 may include electrically conductive materials that are electrically coupled to the one or more graphene surfaces 22 of the electrified PDC component 12. In certain embodiments, "coupled" is defined in direct physical contact. The electrically conductive materials are composed may be composed of various materials (e.g., conductive materials, copper, copper alloys, brass, nickel alloys, titanium alloys, aluminum alloys, silver alloys) different from graphene. As such, when a voltage is applied to the electrically conductive material, an electrical current flows through the graphene surfaces 22 in contact with the electrically conductive material. As described in more detail herein, the electrical current flowing through the one or more graphene surfaces 22 of the PDC portions 20 may be used to sense physical, mechanical, or chemical changes local to the electrified PDC component 12.

In certain embodiments, the electrified PDC component 12 are interconnected (e.g., electrically). As such, multiple graphene surfaces 22 of the PDC portions 20 may be coupled to one another with a wiring system internal or external to the PDC component 12. The wiring system may provide physical contact of the graphene surfaces 22 and/or inductive coupling of the graphene surfaces 22. In this manner, the interconnected graphene surfaces 22 may sense information regarding the contact pressure of the bearing illustrated in FIG. 2A and/or the bushing illustrated in FIG. 2B.

Figure 3:
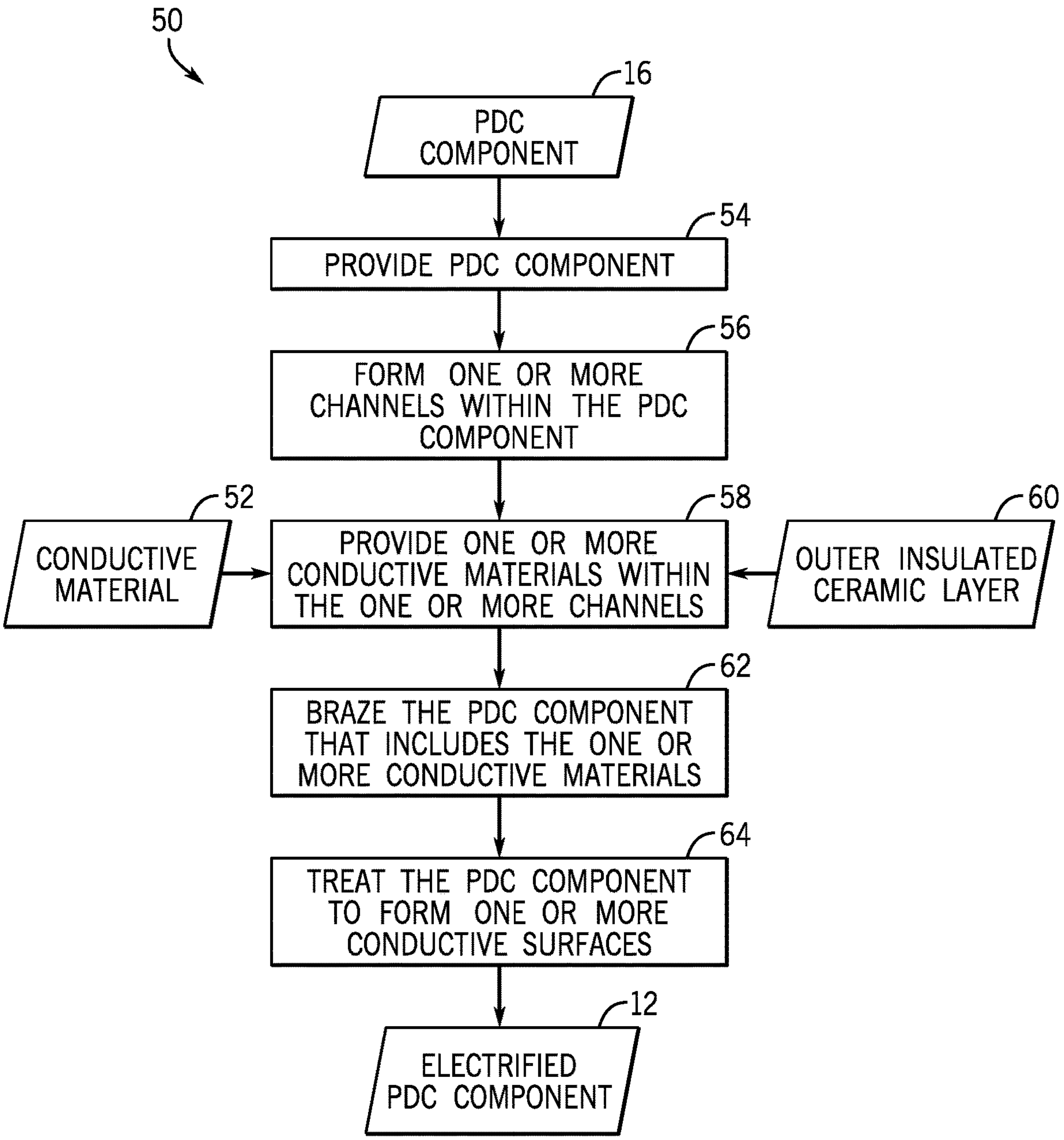
FIG. 3 is a flow diagram of a method for including one or more conductive materials in the electrified PDC, in accordance with the present disclosure.

In some embodiments, the electrified PDC component 12 may include electrically conductive materials that are electrically coupled to the graphene surfaces 22. It may be advantageous to electrically couple the graphene surfaces 22 with electrically conductive materials through channels within the PDC portions 20 to allow electrical monitoring of the graphene surfaces 22 and surrounding environments without external circuitry. In this manner, forming interconnected graphene surfaces 22 using electrically conductive materials within the PDC portions 20 may increase viability for operations within oil and gas field applications where external circuitry may be unstable. FIG. 3 is a flow diagram of an embodiment of a process 50 for producing an electrified PDC component 12 that includes electrically conductive materials 52. At block 54, the process 50 includes providing, the PDC component 16. In general, block 54 may be performed in a generally similar manner as described with respect to block 14 of FIG. 1. Although the steps of method 50 are described in a particular order, it should be noted that the steps of the method 50 may be performed in any suitable order and are not limited to the order presented herein.

At block 56, the process includes forming one or more channels within the PDC component 16. In some embodiments, the channels (e.g., cavities, microchannels, passages) within the PDC component 16 are formed using laser ablation (e.g., micro-patterning, laser sintering). In some embodiments, the one or more channels are formed in the PDC component 16 through photothermal interactions (e.g., spatially confined heating) and/or photoablative interactions (e.g., breaking chemical bonds). In some embodiments, the process 50 may include selecting illumination settings (e.g., laser wavelength, power, pulsed, continuous wave, laser beam spot size) such that the graphene surfaces 22 have material properties that match certain material properties of the PDC component 16. For example, the process 50 may include selecting illumination settings such that the thermal properties (e.g., specific heat, melting point, thermal conductivity) of the graphene surfaces 22 match the thermal properties of the non-electrified PDC (e.g., before using laser ablation to form the one or more channels). Additionally or alternatively, the process 50 may include selecting illumination settings such that the optical properties (e.g., reflectivity, absorptivity, scattering) of the graphene surfaces 22 match the optical properties of the non-electrified PDC. In some instances, a laser is used to form channels on the surface of the PDC component 16 and an internal channel is formed by using another portion of PDC to enclose the channel. In some instances, internal channels are directly formed within the PDC component 16 providing channels for incorporation of conductive materials.

As such, at block 58, the process 50 includes providing one or more electrically conductive materials 52 within the one or more channels. The one or more electrically conductive materials 52 (e.g., poles, rods, wires, etc.) extend through the one or more PDC portions 20 such that the electrically conductive materials 52 contact PDC (e.g., PDC component 16, electrified PDC component 12, PDC portion 20), further discussed in regards to FIG. 4A. The one or more electrically conductive materials 52 may be formed from noble metals (e.g., gold, silver, platinum), stainless steel, graphite, copper, zinc, and/or other suitable materials. For example, the one or more electrically conductive materials 52 may be a conductive rod made from stainless steel. In other examples, the one or more conductive materials 52 may be a wire formed from copper.

In some embodiments, the process 50 may include providing an outer insulated ceramic layer 60 to the one or more electrically conductive materials 52 before brazing the PDC component 16 that includes the one or more electrically conductive materials 52. In this manner, the electrically conductive materials 52 are coupled to the outer insulated ceramic layer 60. The outer insulated ceramic layer 60 may be alumina based, steatite based, metallized ceramic insulators, or a combination thereof that provide post-processing at high temperatures (e.g., 425° C. to 1300° C.) while maintaining insulation and/or protection of the electrically conductive materials 52.

At block 62, the process 50 includes brazing the PDC component 16 that includes the one or more electrically conductive materials 52 to join the one or more electrically conductive materials 52 to the PDC components 16. As such, the PDC component 16 that includes the one or more electrically conductive materials 52 insulated by the outer insulated ceramic layer 60 are joined together by heating the PDC component 16 above the melting point of a filler metal (e.g., silver, copper, aluminum alloys, etc.) but below the melting point of the PDC component 16, the one or more electrically conductive materials 52, and the outer insulated ceramic layer.

At block 64, the process 50 includes treating, via an energy source, the PDC portions 20 to form one or more graphene surfaces 22 to form the electrified PDC component 12 from the PDC component 16. In general, block 64 may be generally similar to block 18 of FIG. 1. In some embodiments, block 64 may be performed before block 56 as to form the electrified PDC component 12 prior to formation of the one or more channels within the PDC component 16. In some instances, it may be advantageous to perform block 64 in the order illustrated in FIG. 3 in order to ensure that the electrified PDC component 12 containing the one or more graphene surfaces 22 is not altered during laser ablation and/or brazing processes.

In some embodiments, the formation of the PDC component 16 that includes the one or more electrically conductive materials 52 insulated by the outer insulated ceramic layer 60 provides internal connection of the graphene surfaces 22. In some instances, it may be advantageous for the graphene surfaces 22 to be internally connected as compared to externally connected to reduce components becoming susceptible to damage during operation. In certain embodiments, the graphene surfaces 22 may be interconnected using with both internal and external connections. For example, the graphene surfaces 22 of a first portion of the PDC portions 20 may be internally interconnected while a second portion of the PDC portions 20 may be connected externally. The first portion of the graphene surfaces 22 may be connected using the electrically conductive materials extending through the one or more PDC portions 20 such that the electrically conductive materials contact (e.g., surround) the PDC portions 20 and the one or more graphene surfaces 22. The second portion of the PDC portions 20 may be connected using the wiring system. In this manner, the wiring system may include external leads, soldering, connections, or the like to provide electrical connection of the graphene surfaces 22.

As described herein, the electrified PDC component 12 may enable detection of physical, mechanical, or chemical changes local to the electrified PDC component 12 that indicate a health condition of the electrified PDC component 12, such as an amount of wear to a surface and/or a remaining-lifetime of the electrified PDC component 12. In some embodiments, the one or more electrically conductive material 52 (e.g., a probe, an electrode, a lead) may promote the flow of current (e.g., flow of charge) from a first of the one or more electrically conductive materials 52 through the graphene surfaces 22 to a second of the one or more electrically conductive materials 52. As such, an electrical measurement (e.g., a potential, a voltage, a resistance) may be output to indicate the health condition of the electrified PDC component 12. In this manner, the presence and/or absence of sensed changes in the health condition may be indicative of surrounding environmental conditions.

Figure 4A:
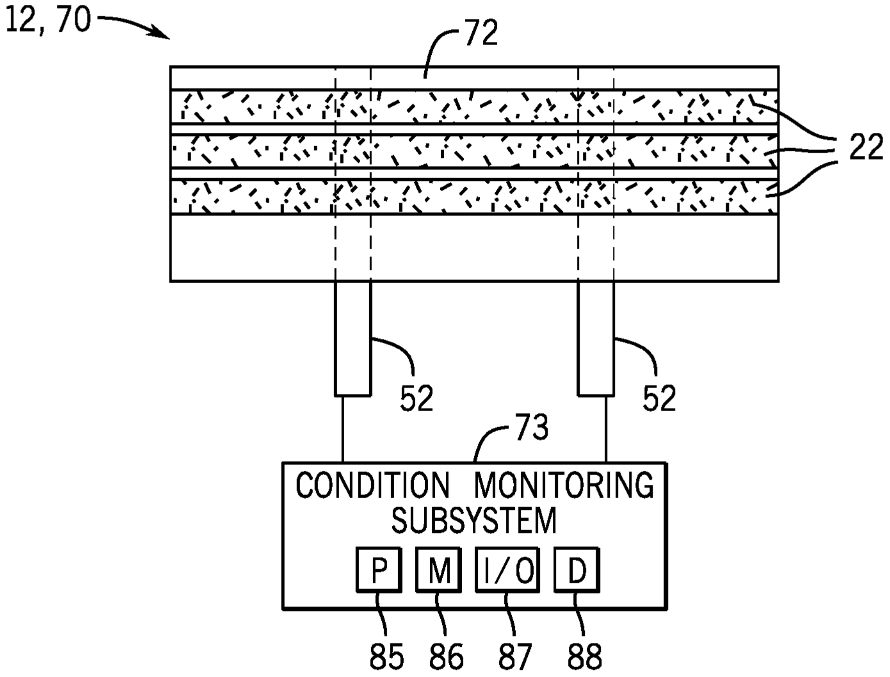
FIG. 4A is a schematic illustration of an embodiment of the one or more conductive materials in the electrified PDC of FIG. 3, in accordance with the present disclosure.

FIG. 4A is a perspective view of a top surface 72 of the electrified PDC component 12, 70 at a first wear state. In general, the one or more electrically conductive materials 52 are configured to sense a change in the one or more graphene surfaces 22 indicative of wear of the electrified PDC component 12. The electrically conductive material 52 is electrically coupled (e.g., interconnected) to multiple graphene surfaces 22, thereby may provide an electrical measurement (e.g., electrical read-out) of the first wear state of the graphene surfaces 22. In certain embodiments, the "first wear state" is defined as a state of the graphene surfaces 22 of the electrified PDC component 12. For example, the PDC component 16 may be a drill bit that includes one or more PDC portions 20. As described herein, the one or more PDC portions 20 of the drill bit are treated using an energy source (e.g., a laser, an electron beam) to form one or more graphene surfaces 22 such that the PDC component 16 is an electrified PDC component 12. As such, the PDC portions 20 of the drill bit are pulsed with the laser to form the graphene surfaces 22.

The electrified PDC component 12 includes the graphene surfaces 22 that are electrically conductive. In general, the graphene surfaces 22 are more electrically conductive (e.g., has a lower sheet electrical resistance) than untreated portions (e.g., PDC portions 20) of the PDC component 16. For example, the sheet electrical resistance of the graphene surfaces may be more than 100 times (i.e., 2 orders of magnitude), more than 250 times, more than 500 times, or more than 1000 times (i.e., 3 orders of magnitude), than the sheet electrical resistance of the PDC component 16. Additionally, the treated carbon region may have a generally higher amount of $sp^2$ carbon. For example, the graphene surfaces 22 may have increased $sp^2$ carbon (e.g., greater than 30%, greater than 40%, greater than 50%), a relatively higher $sp^2/sp^3$ ratio (e.g., greater than 0.5, greater than 1.0, greater than 1.5), a relatively low surface resistance (e.g., less than 1000 (2/cm), or a combination thereof, as compared to untreated PDC portions.

As shown, the electrified PDC component 12 is coupled to a condition monitoring subsystem 73. As described in more detail below, the condition monitoring subsystem 73 is capable of detecting mechanical, physical, and/or chemical changes in the graphene surfaces 22.

Figure 4B:
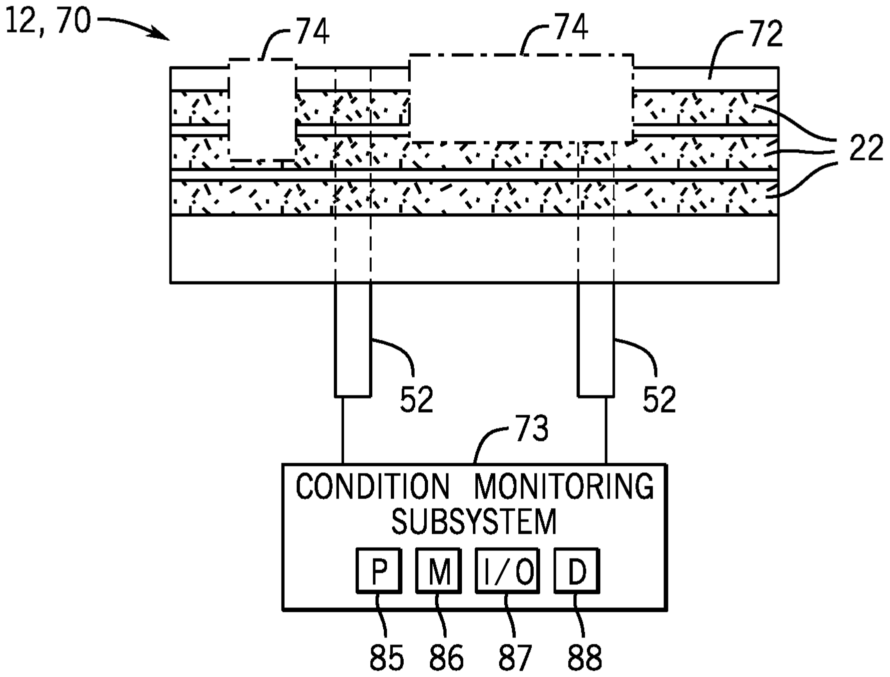
FIG. 4B is a schematic illustration of an embodiment of the one or more conductive materials in the electrified PDC of FIG. 3, in accordance with the present disclosure.

FIG. 4B is a perspective view of a top surface 72 of the electrified PDC component 12, 70 with the one or more electrically conductive materials 52 at a second wear state (e.g., a time period after the first wear state after a mechanical, physical or chemical change of the electrified PDC 22 has occurred). In some embodiments, one or more wear areas 74 may develop on the graphene surfaces 22 (e.g., the electrified PDC 22) of the electrified PDC component 12, 70 at the second wear state.

In general, and as discussed in more detail herein, the electrified PDC component 12 is capable of producing a detectable, measurable, or observable change in the electrical property of at least a portion of a surface or a volume of graphene surfaces 22 due to certain downhole conditions or external factors. For example, such downhole conditions of external factors may include force (e.g., applied to the electrified PDC component 12), stress, pressure, displacement, strain, water, humidity, exposure to one or more fluids that may interact with the graphene surfaces 22 (e.g., the one or more conductive surfaces of the graphene surfaces 22), such as water, carbon dioxide, hydrogen sulfide, hydrogen, an acid, or a base, and/or build-up of materials onto a surface of an electrified PDC component 12 (e.g., downhole component). As referred to herein, a "electrical signal" may include a change (e.g., change in an electrical property, change in physical property) in an impedance of a material, which may be the results of a change in an inductance, a capacitance, and a resistance (e.g., a surface electrical resistance) under a varying electrical potential or current. As such, the one or more graphene surfaces 22 of the electrified PDC component 12, 70 generates the electrical signal based on an applied pressure, an applied strain, an applied electrochemical potential, or an applied electromagnetic field, or a combination thereof. With this in mind, the electrical signal produced by the graphene surfaces 22 of the electrified PDC component 12, 70 may be indicative of the second wear state. In some instances, the 'second wear state" is defined as a state in which there has been change in the electrical property and/or change in the physical property of the electrified PDC component.

In the illustrated embodiment, for example, the electrified PDC component 12, 70 includes multiple wear areas 74 where the graphene surfaces 22 may have eroded or otherwise experienced wear (e.g., mechanical, physical, or chemical wear). Within the wear areas 74, the graphene surfaces 22 are eroded to the second wear state of the electrified PDC component 12. For example, the graphene surfaces 22 may experience gradual destruction during operation. As such, the graphene surfaces 22 are capable of detecting such changes inside (e.g., on an interior surface) or outside (e.g., on an exterior surface) of the downhole component in which the electrified PDC component 12 is included. For example, a change in current flowing through the electrified PDC component 12 may occur due to the wear areas 74 in which the graphene surfaces 22 have eroded. Additionally, a change in dielectric constant may be measured based on changes in the composition of the electrified PDC component 12. Advantageously, because of changes resulting from the second wear state, the electrified PDC component 12 may be able to detect a circumstance that would normally precede a failure, and as such prevent a failure from occurring.

Figure 4C:
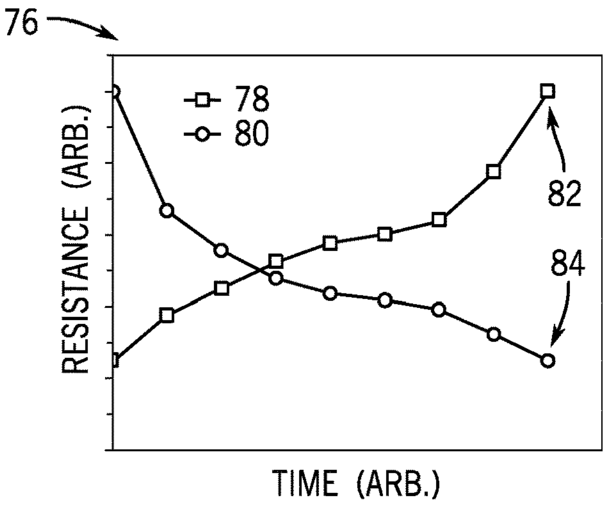
FIG. 4C is a graph of the resistance and thickness versus time of the one or more conductive materials, in accordance with the method of FIG. 3.

FIG. 4C is a graph 76 showing a measured resistance (e.g., left y-axis) of the electrified PDC component 12, 70 versus a time (e.g., x-axis) of use of the electrified PDC component 12, 70. More specifically, the graph 76 shows a resistance trend line 78 in which the resistance trend line 78 increases with time. The graph 76 also shows a measured thickness (e.g., right y-axis) of the graphene surfaces 22 of the electrified PDC component 12, 70 versus time (e.g., x-axis). More specifically, the graph 76 shows a thickness trend line 80 in which the measured thickness of the graphene surfaces 22 of the electrified PDC component 12, 70 decreases with time. In general, the measured resistance increases as the measured thickness of the one or more graphene surfaces 22 of the electrified PDC component 12, 70 decrease. Accordingly, the measured resistance may (e.g., at time 82) be used to determine a corresponding point 84 of the measured thickness of the graphene surfaces 22 of the electrified PDC component 12, 70. In this manner, the measured resistance may be used to determine conditions of the electrified PDC component 12, 70 during operations of the electrified PDC component 12, such as a thickness or amount of the graphene surfaces 22 that may be used to determine a health condition, a presence of chemical species, an environmental condition, or a combination thereof.

To measure the resistance, and perform certain other operations described herein, the electrified PDC component 12, 70 of FIG. 4A and FIG. 4B may be coupled to a condition monitoring subsystem 73. As shown, the condition monitoring subsystem 73 includes a processor 85, a memory 86, an input/output (I/O) port 87, and/or a display 88. The processor 85 may be any suitable type of computer processor or microprocessor capable of executing computer-executable code. Moreover, the processor 85 may include multiple microprocessors, one or more "general-purpose" microprocessors, one or more special-purpose microprocessors, and/or one or more application specific integrated circuits (ASICS), or some combination thereof. For example, the processor 85 may include one or more than one reduced instruction set (RISC) or complex instruction set (CISC) processors. In some embodiments, the processor 85 may detect or measure the resistance at time 82 (e.g., point). In turn, the processor may determine a thickness (e.g., a point 84) that corresponds to the measured resistance. Then, the processor 85 may generate a health condition output (e.g., indicating a remaining amount of graphene surfaces 22 or a time period when the electrified PDC component 12, 70) should be removed for use in oil and gas operations. It should be noted, that the condition monitoring subsystem 73 may be directly connected to the electrified PDC component 12, 70 and/or remotely connected (e.g., wireless connection, etc.).

In certain embodiments, the processor 85 may measure a current flowing through the graphene surfaces 22 at a first time period. After the first time period, the processor 85 may measure the current flowing through the graphene surfaces 22 at a second time period. A chemical change may reduce the amount of PDC portions 20, thereby reducing the ability of electrical current to flow along the graphene surface 22 or between multiple graphene surfaces 22. Accordingly, the processor 85 may determine that the current corresponding to the second time period is less than the current corresponding to the first time period, which indicates that a chemical change has occurred in the graphene surfaces 22.

The memory 86 may be any suitable articles of manufacture that can serve as media to store processor-executable code, data, or the like. These articles of manufacture may represent non-transitory, computer-readable media (e.g., any suitable form of memory or storage) that may store the processor-executable code used by the processor 85 to perform the presently disclosed techniques. The memory 86 may also be used to store data, various other software applications, and the like. For example, the memory 86 may not only store the processor-executable code used by the processor 85 to perform various techniques described herein but code for other techniques as well. It should be noted that non-transitory merely indicates that the media is tangible and not an electrical signal.

The input/output (I/O) ports 87 may be interfaces that may couple to other peripheral components such as input devices (e.g., keyboard, mouse), sensors, input/output (I/O) modules, and the like. The display 88 may operate to depict visualizations associated with software or executable code being processed by the processor 85. In one embodiment, the display 88 may be a touch display capable of receiving inputs from a user. The display 88 may be any suitable type of display, such as a liquid crystal display (LCD), plasma display, or an organic light emitting diode (OLED) display, for example. In some embodiments, the condition monitoring subsystem 73 may provide real time feedback of wear states of the electrified PDC component 12. In the illustrative embodiment, the condition monitoring subsystem 73 is shown to be coupled to the electrified PDC component 12. In some instances, the condition monitoring subsystem 73 may be separate from the electrified PDC component 12. As such, wear states of the graphene surfaces 22 may be monitored at different time periods. For example, the processor 85 may measure the resistance of the graphene surfaces 22 after use (e.g., once the PDC component 12 is brought uphole). As such, the display 88 of the condition monitoring subsystem 73 may be used to provide information from the processor 85 of wear states of the electrified PDC component 12. In other instances, the condition monitoring subsystem 73 may be used to actively monitor the graphene surfaces 22 (e.g., during downhole operations).

Figure 5:
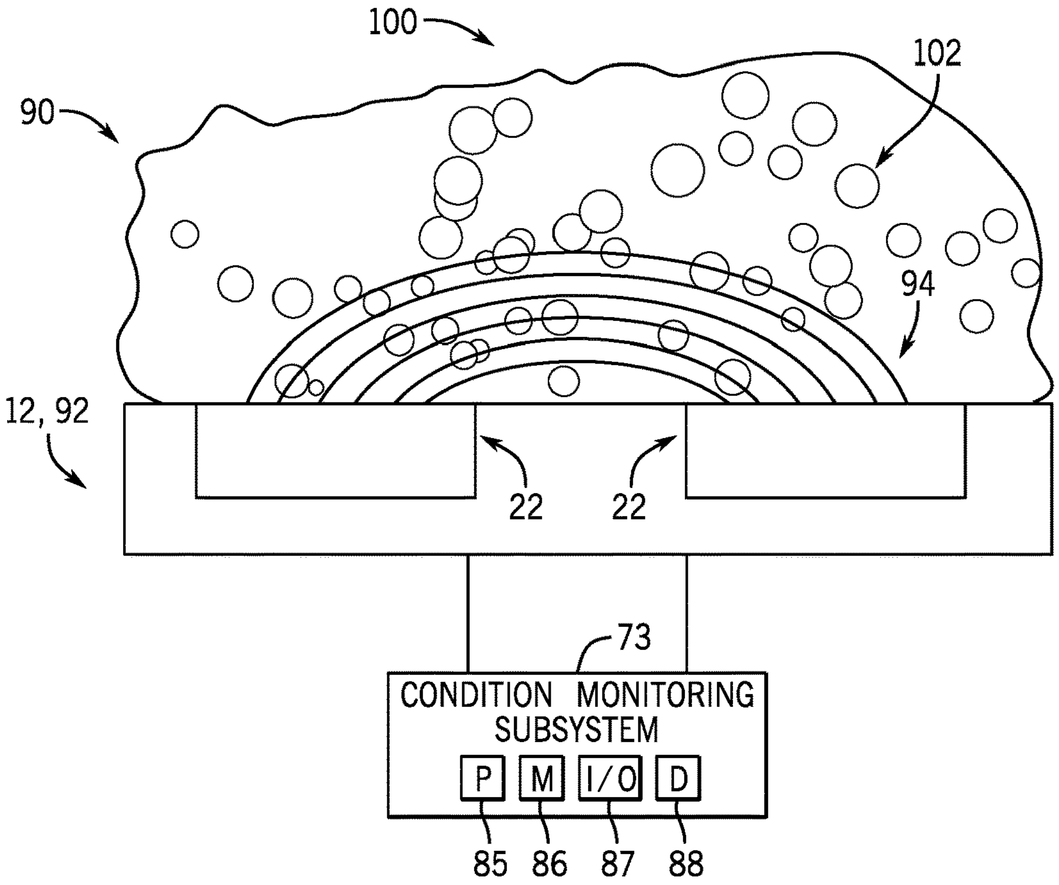
FIG. 5 is a schematic illustration of an embodiment of the one or more conductive materials in the electrified PDC of FIG. 3, in accordance with the present disclosure.

As described herein, the electrified PDC component 12 may enable detection of a presence of chemical species (e.g., a fluid external to or interactive with the electrified PDC component 12) local to (e.g., surrounding, within a threshold distance) the electrified PDC component 12. To illustrate this, FIG. 5 shows an illustrative embodiment 90 of a cross-sectional view of the electrified PDC component 12, 92. In the illustrated embodiment, the electrified PDC component 12, 92 includes multiple graphene surfaces 22 (e.g., one or more patterned surface, an array, an electric circuit). The graphene surfaces 22 are formed of graphene (e.g., treated with the laser) and, as such, form a continuous electrically conductive pattern (i.e., along connected portions of graphene). In certain embodiments, the graphene surfaces 22 may take on various configurations including but not limited to forming a zigzagging pattern, a wave pattern, a square wave pattern, a U-shaped pattern, a semi-circular strip, an arcuate strip, a branching pattern, and the like. For example, the graphene surfaces 22 of the illustrated embodiment may form a continuous electrically conductive pattern enabling the electrified PDC component 12, 92 to report (e.g., generate the electrical signal, measure a current, etc.) on changes to the graphene surfaces 22 as further discussed below regarding FIG. 6.

In some embodiments, the electrified PDC component 12, 92 is coupled to the condition monitoring subsystem 73 as generally described above in relation to FIG. 4C. As such, if the electrified PDC component 12, 92 is subjected to a fluid 100 that induces a chemical change in electrical conductivity of the graphene surfaces 22 may be reported by the condition monitoring subsystem 73 via the processor 85. In some embodiments, the graphene surfaces 22 of the electrified PDC component 12, 92 induce a current (e.g., by applying a voltage) via generation of an electrical field 94 (e.g., electromagnetic field) that may indicate the presence of one or more ions 102 on or near the surface of the electrified PDC component 12, 92. For example, the change in the electrical field 94 (e.g., based on a relative change) of the electrified PDC component 12, 92 may be sensed inducing the electrical signal. As such, the electrical signal may be received by the processor 85 of the condition monitoring subsystem 73 and may provide information to the user. Further, exposure of the electrified PDC component 12, 92 to fluids, stress (e.g., stress exceeding a threshold), an amount of scale (e.g., a mass of scale), a pressure induced by fluids or a solid material in the like, based on the electrical property data may generate the electrical signal indicative that change in the graphene surface 22 has occurred. For example, the electrical field 94 of the electrified PDC component 12, 92 may sense a change in resistance, and/or other properties as discussed herein, indicative of exposure of a mechanical component having the graphene surfaces 22 exposed to one or more fluids and/or one or more gases (e.g., water, carbon dioxide, sour gas, hydrogen, and the like).

Figure 6:
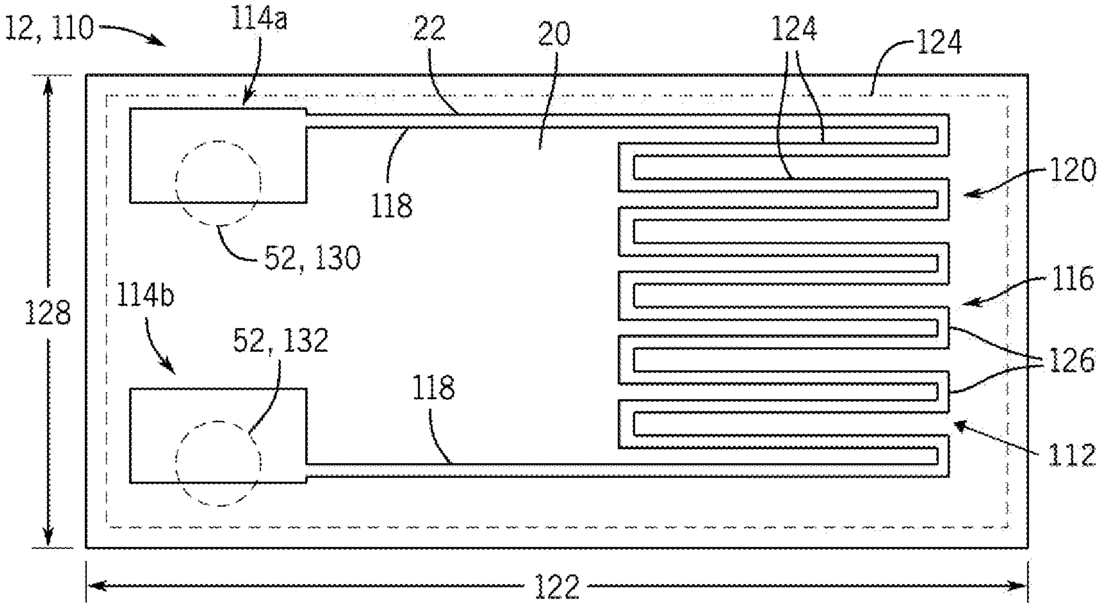
FIG. 6 is a perspective view of an embodiment of the electrified PDC, in accordance with the present disclosure.

To illustrate an embodiment of one or more patterned surfaces on the electrified PDC component 12, FIG. 6 is a schematic top view of the embodiment on the electrified PDC component 12, 110 that may be utilized for detecting mechanical strain applied to a downhole component treated to form the one or more graphene surfaces 22 (e.g., a strain applied along the first axis 122 and/or second axis 128). In the illustrated embodiment, the electrified PDC component 12, 110 includes a patterned surface 112 of the graphene surfaces 22 with pad regions 114*a* and 114*b* that are physically and electrically coupled via an intermediate or intervening region 116 of the graphene surfaces 22. Each pad region 114*a* and 114*b* may be a rectangular, circular, oval, or polygonal pad region. In general, the intervening region 116 includes the graphene surfaces 22 (e.g., electrically conductive surfaces) forming a zigzagging or wave pattern 120 between adjacent connecting portions 118 (e.g., strips) coupled to the pad regions 114*a* and 114*b*. The adjacent connecting portions 118 extend along (e.g., parallel to) the first axis 122. The wave pattern 120 may be shaped as a square wave pattern having parallel sides 124 coupled together at flat peaks 126, which alternate between opposite ends of the parallel sides 124. The parallel sides 124 extend along the first axis 122, while the flat peaks 126 extend along a second axis 128. The electrified PDC component 12, 110 of FIG. 6 may be utilized to detect strain or pressure applied to a downhole component treated to form the one or more graphene surfaces 22. In particular, a strain or force applied to the intervening region 116 may reduce the current flowing between the pad regions 114*a* and 114*b*. Accordingly, the patterned surface 112 shown in FIG. 6 illustrates an arrangement of the graphene surfaces 22 that may facilitate the detection of mechanical strain applied to the electrified PDC component 12, 110. That is, a mechanical strain imparted to the patterned surface 112 may cause a deformation, resulting in a modification (e.g., increase or decrease) to a length of a conductive path between the pad regions 114*a* and 114*b*. As such, if the length of the conductive path increases, then the sheet resistance of the electrified PDC component 12, 110 may decrease. Alternatively, if the length of the conductive path decreases, then the sheet resistance of the electrified PDC component 12, 110 may increase.

In some embodiments, the electrified PDC component 12, 110 may include the one or more electrically conductive materials 52 (e.g., poles, rods, wires, electrodes, etc.) that extend through the electrified PDC component 12, 110 such that the electrically conductive materials 52 are surrounded by the PDC portions 20, the one or more graphene surfaces 22, or both. For example, the one or more electrically conductive materials 52 may provide a first electrode 52, 130 and/or a second electrode 52, 132 capable of applying voltage to the electrified PDC component 12, 110. The electrically conductive materials 52 (e.g., 130) and/or 52 (e.g., 132) are insulated with the outer insulated ceramic layer. As such, the electrified PDC component 12, 110 detects a health condition of a downhole component (e.g., bushing, bearing, sealing component, etc.), a presence of chemical species in the electrified PDC component, or an environmental condition of a local environment of the downhole component, or a combination thereof.

Figure 7:
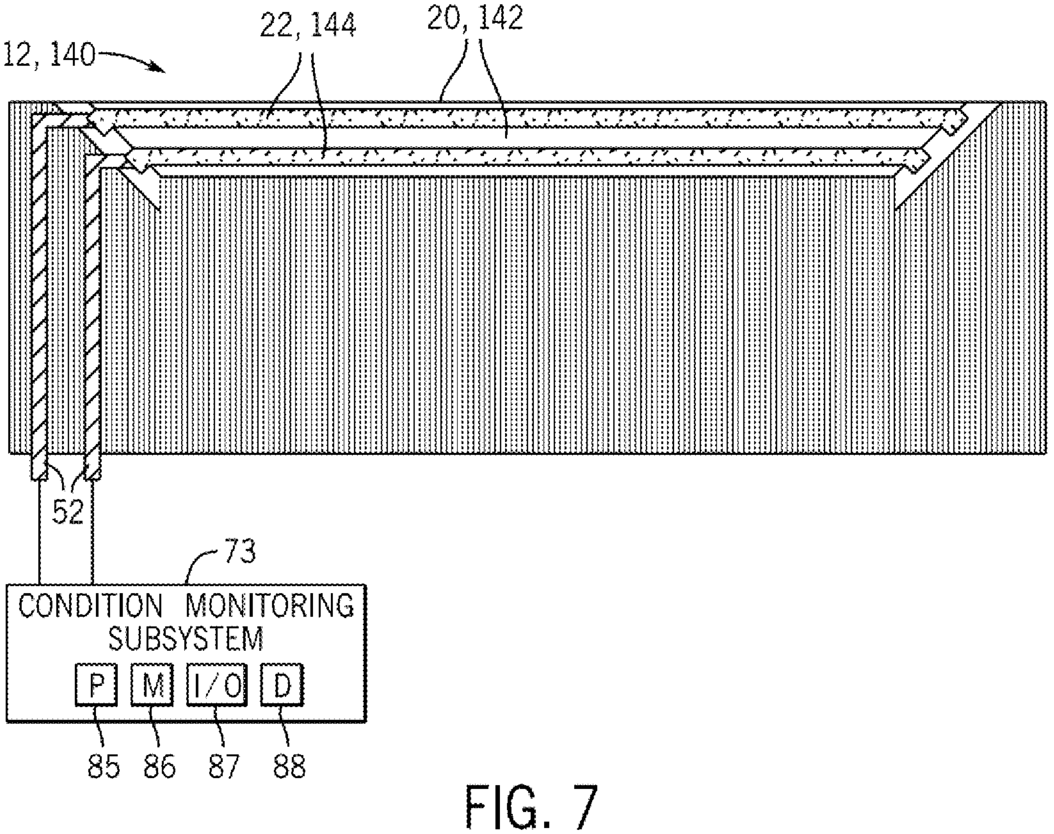
FIG. 7 is a schematic illustration of an embodiment of the electrified PDC component, in accordance with the method of FIG. 1.

FIG. 7 is a schematic illustration of an embodiment of the electrified PDC component 12. The illustrated embodiment shows the electrified PDC component 12 implemented as a sealing component 140 (e.g., valve seat, choke insert, etc.). The sealing component 12, 140 is machined to provide electrical connectivity to the graphene surfaces 22. As such, the electrified PDC component 12, 140 may include one or more PDC portions 20, 142 (e.g., non-electrified) and one or more graphene surfaces 22, 144. The PDC portions 20, 142 may be positioned on alternating surfaces of the sealing component 140 relative to the graphene surfaces 22, 144. In this manner, gradual wear of the sealing component 140 may generate the electrical signal via the electrically conductive materials 52 (e.g., connectors) to the condition monitoring subsystem 73 as generally described above in relation to FIG. 4C. It should be noted, that the condition monitoring subsystem 73 may be directly connected to the sealing component 140 and/or remotely connected (e.g., wireless connection, etc.).

Figure 8:
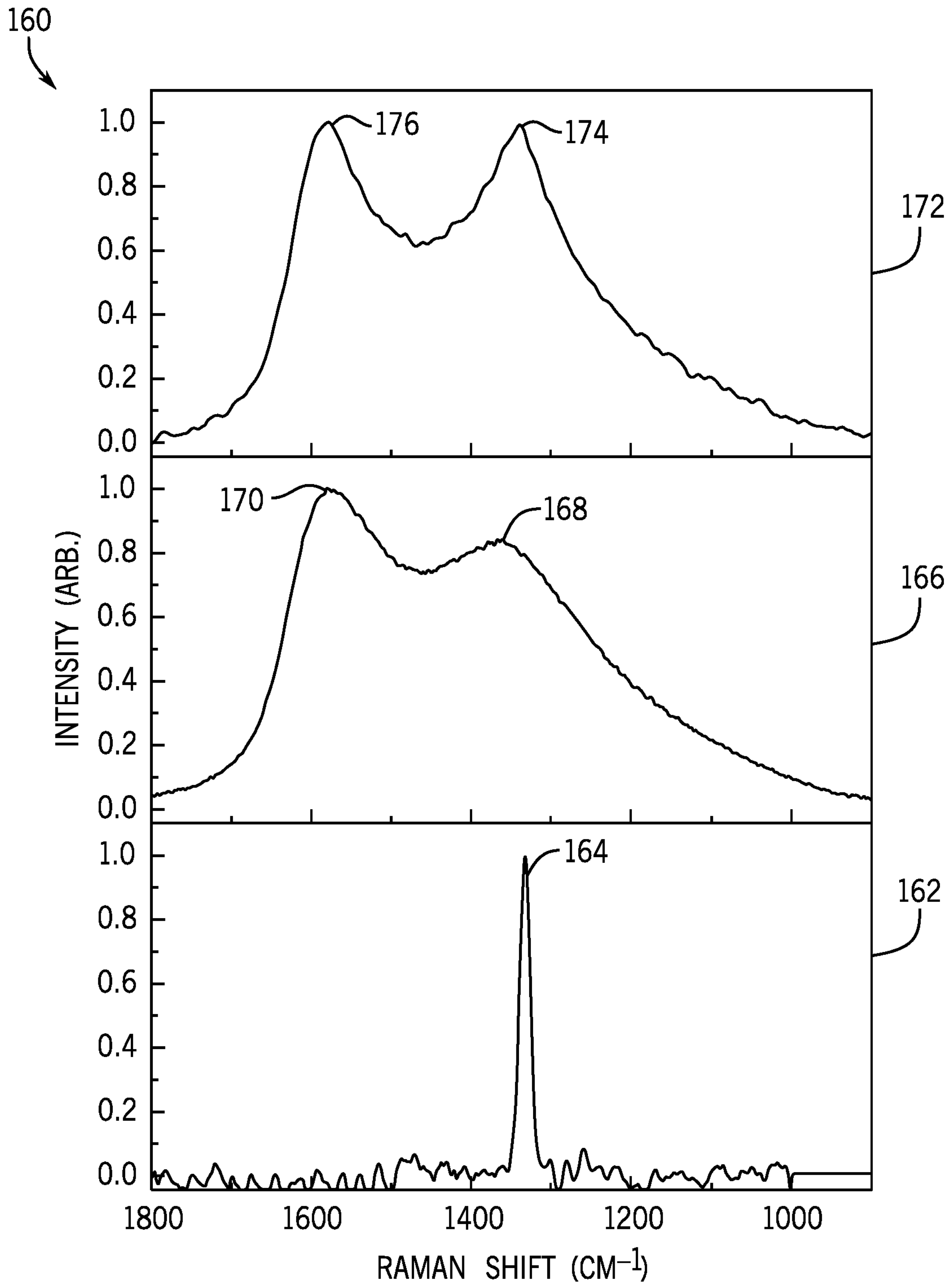
FIG. 8 is a graph of the intensity versus Raman shift of the PDC before, during and after electrification, in accordance with the methods of FIG. 1 and/or FIG. 3.

FIG. 8 is a graph 160 showing a measured Intensity (e.g., y-axis) versus a Raman shift (e.g., x-axis) of the graphene surfaces 22 of the electrified PDC component 12. The Raman shift was measured from 1000 $cm^{-1}$ to 2000 $cm^{-1}$ after excitation with a laser source (e.g., 532 nm in this example). A subplot 162 shows the measured intensity versus the Raman shift of the PDC component 16 (i.e., prior to electrification) identifying a presence of graphene on the PDC component 16. A single peak 164 (e.g., approximately 1339 $cm^{-1}$) is indicative of diamond present in the PDC component 16. As such, subplot 162 indicates that the measured PDC component 16 contains diamond (e.g., diamond is present in the PDC).

A subplot 166 shows the measured Intensity versus the Raman shift of the electrified PDC component 12, formed by treating the PDC component 16 with the energy source (e.g., laser). In subplot 166 the PDC component 16 is pulsed with 25 laser pulses (e.g., at 100% laser power) to form the graphene surfaces of the electrified PDC components 12. However, it should be noted that any suitable number of laser pulses may be used, such as 5 or more pulses, 10 or more pulses, 15 or more pulses, or 20 or more pulses. It should be noted that description herein is meant to be a non-limiting example of techniques for electrification of the PDC component 16, and the any other suitable excitation properties, such as pulse widths, laser power, and so on, may be used. The subplot 166 shows a peak 168 (e.g., a D-band at approximately 1350 $cm^{-1}$) and a peak 170 (e.g., a G-band at approximately 1580 $cm^{-1}$). The D-band and G-band are used to measure the presence of graphene within the graphene surfaces. The D-band, the peak 168 of the subplot 166, represents an aromatic ring breathing mode resulting from $sp^2$ carbon aromatic rings of graphene. In certain instances, the D-band is weak (e.g., not predominant) relative to the G-band. The G-band, the peak 170 of the subplot 166, represents the planar configuration of $sp^2$-bonded carbon of graphene. The G-band signifies that graphene is present in the PDC component 12. It should be noted, that the G-band position can shift slightly to lower energies as the measured thickness of the graphene surfaces of the electrified PDC component increases.

A subplot 172 shows the measured intensity versus the Raman shift of the electrified PDC component 12, formed by treating the PDC component 16 with the energy source (e.g., laser). In general, the subplot 172 shows an increased amount of graphene formed after treating the PDC component 16 as compared to subplot 166. Accordingly, in subplot 172 the PDC component 16 is pulsed with 100 laser pulses (e.g., at 100% laser power) to form the graphene surfaces 22 of the electrified PDC components 12. As such, the subplot 172 shows a peak 174 (e.g., a D-band at approximately 1350 $cm^{-1}$) and a peak 176 (e.g., a G-band at approximately 1580 $cm^{-1}$) measuring the presence of graphene within the graphene surfaces 22. The D-band, the peak 174 of the subplot 172, represents an aromatic ring breathing mode resulting from $sp^2$ carbon aromatic rings of graphene. The G-band, the peak 176 of the subplot 172, represents the planar configuration of $sp^2$-bonded carbon and signifies presence of graphene. It should be noted that the G-band position can shift slightly to lower energies as the measured thickness of the graphene surfaces 22 of the electrified PDC component 12 increases.

In the illustrated embodiment, the peak 176 (e.g., the G-band after 100 laser pulses) of the subplot 172 has a full width at half maximum (FWHM) that is narrower relative to the FWHM of the peak 170 (e.g., the G-band after 20 laser pulses) of the subplot 166. As such, the FWHM of the peak 176 of the subplot 172 indicates that the electrified PDC component 12 of subplot 172 has a graphene concentration higher than the electrified PDC component 12 of subplot 166. In this manner, an intensity ratio (e.g., D-band to G-band ratio) may be calculated to measure the graphene concentration (e.g., graphene concentration present on a surface of the electrified PDC component 12. The intensity ratio of the electrified PDC component 12 of the subplot 166 is 2.10. The intensity ratio of the electrified PDC component 12 of the subplot 172 is 2.07. The intensity ratio of the subplot 172 is lower than the intensity ratio of subplot 166 indicating the graphene concentration of the electrified PDC component 12 treated with 100 laser pulses (e.g., subplot 172) is higher than the electrified PDC component 12 treated with 25 laser pulses (e.g., subplot 166).

With the foregoing in mind, the graphene concentration is further measured based on the measured resistance of the graphene surfaces 22 of the electrified PDC component 12. Accordingly, a measured surface resistance provides relative comparison of the graphene concentration of the electrified PDC component 12 wherein a lower surface resistance is indicative of higher graphene concentration. The measured surface resistance of the electrified PDC components 12 of the subplot 166 is 460 Ohm/cm. The measured surface resistance of the electrified PDC components 12 of the subplot 172 is 350 Ohm/cm. In general, the measured surface resistance of below 1000 Ohm/cm is indicative of a presence of the electrified PDC component 12. Additionally, the measured surface resistance may range from 200 Ohm/cm to 600 Ohm/cm, 200 Ohm/cm to 800 Ohm/cm, 400 Ohm/cm to 800 Ohm/cm, or 200 Ohm/cm to 1000 Ohm/cm. As such, the electrified PDC components 12 of the subplot 172 treated with 100 laser pulses has higher graphene concentration compare to the electrified PDC components 12 of the subplot 166 treated with 25 laser pulses.

In certain embodiments, the measured surface resistance of the graphene surfaces 22 of the electrified PDC component 12 is used to measure changes in pressure during operation of the electrified PDC component (e.g., bushing use, bearing use, drill bit use). In general, the measured resistance of the graphene surfaces of the electrified PDC component 12 decreases with increasing pressure (e.g., pressure ranging from 100 MPa to 600 MPa). In this manner, the measured resistance at a lower pressure (e.g., 100 MPa, 150 MPa, 200 MPa) is higher (e.g., 160 Ohm/cm, 165 Ohm/cm, 155 Ohm/cm) than the measured resistance (e.g., 60 Ohm/cm, 80 Ohm/cm, 100 Ohm/cm) at a higher pressure (e.g., 300 MPa, 400 MPa, 500 MPa, 600 MPa). As such, graphene surfaces 22 of the electrified PDC component 12 is used to sense changes in environmental pressure during operation of tools in which the electrified PDC component 12 is included.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

an electrified polycrystalline diamond compact component, comprising one or more graphene surfaces configured to generate an electrical signal based on a combination of two or more of an applied pressure, an applied strain, an applied electrochemical potential, or an applied electromagnetic field; and a controller communicatively coupled to the electrified polycrystalline diamond compact component, the controller having a memory and a processor configured to:

receive and actively monitor the electrical signal generated by the electrified polycrystalline diamond compact component; and process the electrical signal to generate one or more output parameters based on a mechanical, physical, or chemical change of the one or more graphene surfaces, wherein the one or more output parameters comprise a thickness of the one or more graphene surfaces, a remaining amount of the one or more graphene surfaces, or a time period indicative of when to discontinue use of the electrified polycrystalline diamond compact component.

2. The system of claim 1, wherein the one or more graphene surfaces form one or more patterned surfaces on the electrified polycrystalline diamond compact component.

3. The system of claim 1, comprising one or more electrically conductive materials that are electrically coupled to the one or more graphene surfaces, wherein the one or more electrically conductive materials are different from graphene.

4. The system of claim 3, wherein the one or more electrically conductive materials extend through the electrified polycrystalline diamond compact component such that the one or more electrically conductive materials contact one or more polycrystalline diamond compact portions of the electrified polycrystalline diamond compact component and the one or more graphene surfaces.

5. The system of claim 4, wherein the one or more electrically conductive materials are surrounded by the one or more polycrystalline diamond compact portions, the one or more graphene surfaces, or both.

6. The system of claim 1, comprising a bushing, a bearing, or both, that includes the one or more graphene surfaces.

7. The system of claim 6, comprising a sealing component configured to generate the electrical signal.

8. The system of claim 1, wherein the controller is configured to provide real-time feedback of one or more wear states of the electrified polycrystalline diamond compact component.

9. A method, comprising:

providing a polycrystalline diamond compact component;

treating, via an energy source, the polycrystalline diamond compact component to form one or more graphene surfaces such that the polycrystalline diamond compact component is an electrified polycrystalline diamond compact component, wherein the one or more graphene surfaces generate an electrical signal based on a combination of two or more of an applied pressure, an applied strain, an applied electrochemical potential, or an applied electromagnetic field; and providing a controller to perform one or more operations comprising:

receiving and actively monitoring the electrical signal generated by the electrified polycrystalline diamond compact component; and processing the electrical signal to generate one or more output parameters based on a mechanical, physical, or chemical change of the one or more graphene surfaces, wherein the one or more output parameters comprise a thickness of the one or more graphene surfaces, a remaining amount of the one or more graphene surfaces, or a time period indicative of when to discontinue use of the electrified polycrystalline diamond compact component.

10. The method of claim 9, further comprising:

forming one or more channels within the electrified polycrystalline diamond compact component;

providing one or more electrically conductive materials within the one or more channels; and brazing the electrified polycrystalline diamond compact component that includes the one or more electrically conductive materials to join the one or more electrically conductive materials to the electrified polycrystalline diamond compact component.

11. The method of claim 10, further comprising:

providing an outer insulated ceramic layer to the one or more electrically conductive materials before the brazing the electrified polycrystalline diamond compact component that includes the one or more electrically conductive materials.

12. The method of claim 11, further comprising treating, via the energy source, one or more polycrystalline diamond compact portions of the electrified polycrystalline diamond compact component after the brazing the electrified polycrystalline diamond compact component that includes the one or more electrically conductive materials.

13. The method of claim 9, further comprising providing the electrified polycrystalline diamond compact component onto a downhole component to monitor a health condition of the downhole component, a presence of chemical species in the electrified polycrystalline diamond compact component, an environmental condition of a local environment of the downhole component, or a combination thereof.

14. The method of claim 9, wherein the one or more graphene surfaces form a three-dimensional circuitry covering one or more surfaces of the electrified polycrystalline diamond compact component.

15. The method of claim 9, wherein one or more electrically conductive materials extend through the electrified polycrystalline diamond compact component such that the one or more electrically conductive materials contact one or more polycrystalline diamond compact portions of the electrified polycrystalline diamond compact component and the one or more graphene surfaces.

16. The method of claim 9, wherein the one or more graphene surfaces form one or more patterned surfaces on the electrified polycrystalline diamond compact component.

17. A system, comprising:

a polycrystalline diamond compact component comprising:

one or more graphene surfaces;

one or more channels within the polycrystalline diamond compact component; and one or more electrically conductive materials within the one or more channels, wherein the one or more electrically conductive materials are joined to the one or more graphene surfaces or to the polycrystalline diamond compact component, or a combination thereof, wherein the one or more graphene surfaces are configured to generate an electrical signal based on a combination of two or more of an applied pressure, an applied strain, an applied electrochemical potential, or an applied electromagnetic field; and a controller communicatively coupled to the polycrystalline diamond compact component, the controller having a memory and a processor configured to:

receive and actively monitor the electrical signal generated by the one or more graphene surfaces; and process the electrical signal to generate one or more output parameters based on a mechanical, physical, or chemical change of the one or more graphene surfaces, wherein the one or more output parameters comprise a thickness of the one or more graphene surfaces, a remaining amount of the one or more graphene surfaces, or a time period indicative of when to discontinue use of the polycrystalline diamond compact component.

18. The system of claim 17, wherein the one or more electrically conductive materials are coupled to an outer insulated ceramic layer.

19. The system of claim 17, wherein the controller is configured to sense a change in the one or more graphene surfaces indicative of wear of the polycrystalline diamond compact component based on the mechanical, physical, or chemical change of the one or more graphene surfaces.

20. The system of claim 17, wherein the one or more electrically conductive materials extend through the polycrystalline diamond compact component such that the one or more electrically conductive materials contact the polycrystalline diamond compact component and the one or more graphene surfaces.

* * * * *